Sept. 8, 1936.　　　H. A. RANLETT　　　2,053,495
VEHICLE BRAKE CONTROL
Filed Aug. 2, 1935　　　2 Sheets-Sheet 1
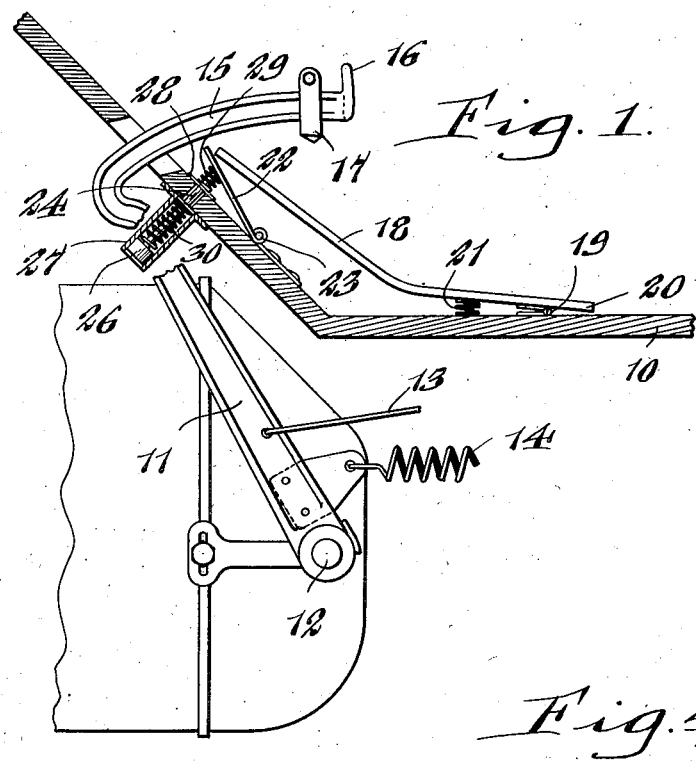
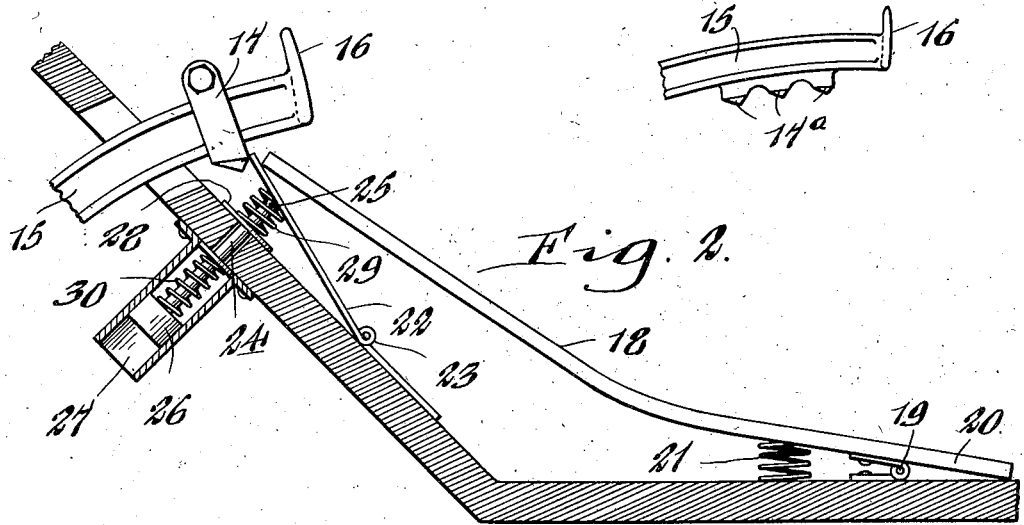
Inventor,
Helen A. Ranlett
Carl W. Weeks
by
Attorney.

Sept. 8, 1936.  H. A. RANLETT  2,053,495
VEHICLE BRAKE CONTROL
Filed Aug. 2, 1935   2 Sheets—Sheet 2
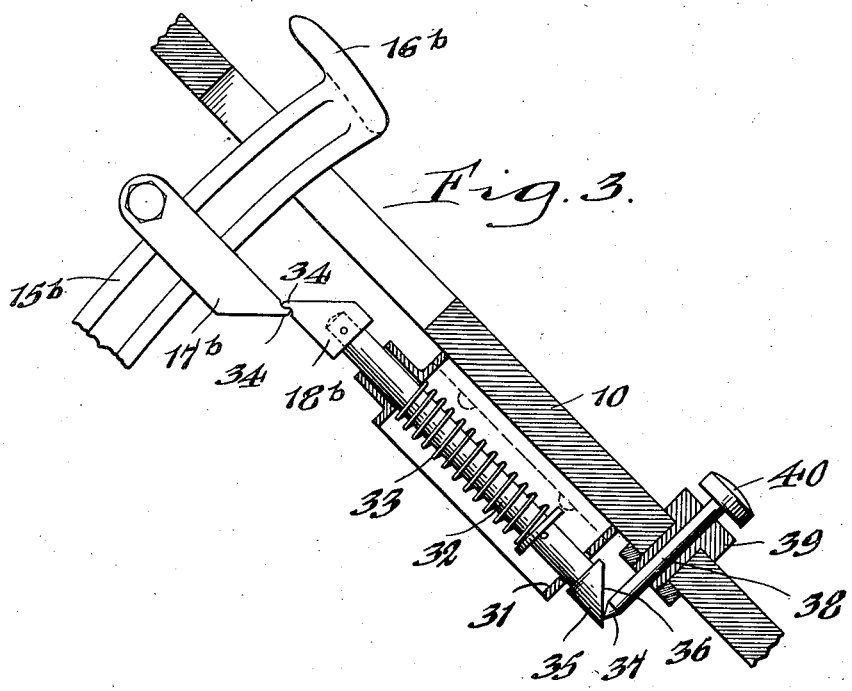
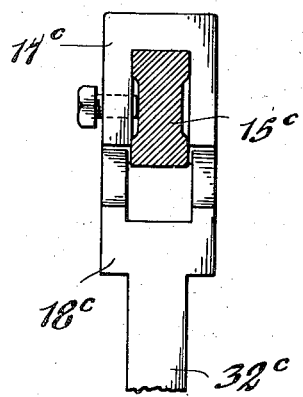
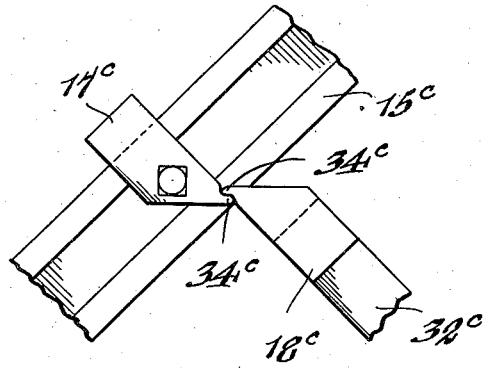
Inventor,
Helen A. Ranlett
by Carl W. Weeks
Attorney.

Patented Sept. 8, 1936

2,053,495

UNITED STATES PATENT OFFICE 2,053,495

VEHICLE BRAKE CONTROL

Helen A. Ranlett, New York, N. Y.

Application August 2, 1935, Serial No. 34,401
In France May 16, 1935

5 Claims. (Cl. 74—542)

This invention relates to improvements in vehicle braking systems and more particularly to such systems applicable to automobiles and like vehicles.

It is a general object of the invention to provide a braking system of the class mentioned wherein the brake, after being set or applied by the operator, is maintained in set position by an improved mechanism which not only is locked in position by a simple operation, but is quickly and easily releasable.

Another object of the invention is to provide, in a brake controlling system of the class mentioned, a brake locking mechanism having an improved holding and releasing device so positioned and arranged that it may be most conveniently operated by a minimum of effort on the part of the operator and being conveniently accessible for operation by the foot which controls the brake pedal.

A further object of the invention is to provide, in a brake controlling system of the class mentioned, an improved locking and releasing mechanism for the brake pedal which not only is easily operable and conveniently accessible to the operator, but may be applied to standard automobile equipment with a minimum of expense and effort.

Other objects of the invention will in part be pointed out in the following detailed description of certain illustrative but preferred embodiments of the invention and will in part be obvious in connection therewith.

For a more complete disclosure of the nature and objects of the invention, reference is had to the following detailed description and to the accompanying drawings, in which:

Fig. 1 is a fragmentary vertical section and elevational view through the driver's compartment of an automobile, showing an application of one embodiment of the invention;

Fig. 2 is an enlarged sectional view similar to Fig. 1, but showing the brake pedal in locked condition;

Fig. 3 is an enlarged sectional view similar to Fig. 2, but disclosing a modified form of the invention;

Fig. 4 is a fragmentary elevation, showing a modification of the locking lug arrangement on the brake pedal lever;

Fig. 5 is a fragmentary sectional and elevational view of a modified form of locking mechanism for the brake pedal lever, and Fig. 6 is a fragmentary side elevation of Fig. 5.

Referring to the drawings for a detailed description of the illustrative embodiments of the invention there shown, and first to the embodiment of Figs. 1 and 2, the floor of the driver's compartment is shown at 10, this compartment being of any well known standard or conventional construction and arrangement. The service brake pedal lever 11 is pivotally mounted at 12 having connected thereto a brake rod 13 which may be connected in any well known manner to the brakes of the automobile. A tensioned spring 14 is connected to the pedal lever to move the latter into normal brake-releasing position and said lever has an extension 15 extending into the driver's compartment and having a pedal member or pad 16 in position for access by the operator's foot. The braking equipment referred to may be the usual standard equipment for service braking as at present installed in motor vehicles, and accordingly may vary in different installations.

In order to lock the brake pedal lever in brake-setting or applying position, an improved locking mechanism is provided. In this embodiment a locking lug 17 is mounted upon the pedal lever extension 15 and may be adjustably attached thereto so as to be adjusted into proper locking position. The lower end of this locking lug is shaped to provide a locking nose cooperable with a locking pawl or detent 18 which in this embodiment is in the form of a metallic plate of sufficient width to provide a convenient contact surface for the operator's foot, and may form a rest for the heel. The pawl or detent plate 18 is pivotally mounted at 19 to the compartment floor having a rearward extension 20 beyond the pivot 19 contacting with the compartment floor to limit upward movement of the forward or locking end of the plate. A compression spring 21 is preferably positioned beneath the pawl plate forwardly of the pivot 19 so as to urge the forward end of the plate upwardly. This detent or pawl plate cooperates with the locking lug 17 as shown in Fig. 2 for holding the pedal lever in depressed or brake-setting position.

The pawl plate 18 is conveniently positioned beneath and in juxtaposition to the brake pedal and is preferably bent or turned upwardly at its forward end so as to cooperate conveniently with the operator's foot, and to be conveniently accessible so as to be reached by a slight movement of the foot from pedal-engaging position.

Beneath the free end of the detent plate 18 is an auxiliary holding member 22 in the form of a plate pivoted at 23 to the compartment floor and having its free end in juxtaposition and normally contacting with the under side of the end of the detent plate, and extending slightly beyond the latter in position for engagement with the locking lug 17.

The auxiliary holding plate 22 is controlled and positioned by a mechanism mounted on the floor 10 and including a plunger rod 24 connected as at 25 to the under side of the said holding plate. Guiding and supporting means are provided for the plunger rod which in this embodiment includes a guiding head or enlargement 26 attached to the rod and slidably engaging a tubular guideway 27 attached to the under side of the floor. Resting upon a seat 28 provided above the floor is a spring 29 cooperating with the auxiliary holding plate, while a similar spring 30 is positioned beneath the floor in the tubular guideway, contacting with the head 26 and a seat resting against the floor. The auxiliary holding plate is thus supported in floating position by the suspension mechanism described, for holding engagement with the locking lug 17. This lug in its downward movement upon pedal depression, will engage against the free end of the holding plate, thus depressing said plate and permitting the locking nose of the lug to pass beyond it. The brake pedal is held in this position against the tension of the spring 14 by engagement of the lug 17 with the under side of the free end of the auxiliary holding member 22, which in turn is maintained against undue retraction by engagement with the detent and controlling plate 18. The two suspension springs 29 and 30 are positioned and relatively stressed so as to maintain the auxiliary holding member 22 in its operative floating position substantially as shown in Fig. 1, in which it will cooperate with the descending lug 17 so as to assume the position of Fig. 2, to effect the locking function.

In the embodiment of the invention shown in Figs. 1 and 2, it will be seen that the detent plate 18 does not contact directly with the locking lug 17 to hold the pedal depressed, but it cooperates therewith through an intermediate pivoted plate or auxiliary holding member 22. As clearly shown in Fig. 2, the auxiliary holding member 22 contacts directly with the lug 17 when the parts are relatively disposed to lock the pedal in brake setting position, but the holding effort required to maintain the pedal in this position is transmitted to and sustained by the detent plate 18 with which the auxiliary holding member is in contacting relation.

The operation of the improved brake-controlling mechanism will now be clearly understood from the above detailed description of one embodiment. Assuming that it is desired to set the brake to slow down or stop the vehicle, as for example when the traffic is stopped by a traffic signal light, or when it is desired to hold the brakes in set condition to park the car, or to hold it upon a hill, or in congested traffic, the brake pedal is depressed by the operator in the usual manner, thus applying the brakes. Also, the locking lug 17 is moved downwardly past the end of the locking pawl plate 18, past the end of the auxiliary plate 22, into the position shown in Fig. 2. This lug is so positioned and adjusted that it will engage underneath the ends of the pawl or detent plate 18 and of the auxiliary holding plate 22, thus locking the pedal in depressed position and holding the brakes in set condition.

As the pressure upon the brake pedal is released, the pedal under the influence of the spring 14, moves reversely or upwardly slightly, until the lug 17 engages the end of the auxiliary holding plate 22 causing the latter to retract slightly into engaging and holding relation with the detent plate 18. The floating suspension of the plate 22 embodying the springs 28 and 29 provides for this locking action and is efficient and effective in locking the pedal in depressed position and in accomplishing subsequent release thereof. After thus setting the brake, it may remain in this condition until it is desired to start the vehicle. Since the brake is thus held in its set or applied condition entirely by the holding mechanism described, the operator is wholly relieved of the necessity of holding the brakes in applied condition by continued expenditure of physical energy, thus avoiding fatigue and physical exhaustion. This advantage is of especial importance where frequent starting and stopping are required, as in congested traffic, where stops are required by traffic stop signals, where stops are required on hills, and under other similar conditions. When the operator is ready to start, the brake pedal may be very quickly and easily released from its locked position merely by pressure of the foot upon the pawl plate 18 forwardly of its pivot 19, thus causing the pedal to be slightly depressed and causing the forward or locking end of the detent plate 18 together with the free end of the auxiliary holding plate 22 to pass beneath the lug 17 whereupon the pedal moves to releasing condition by operation of the spring 14. The pawl plate 18 is held in its locking position against the tension of spring 14 by engagement of the rearward extension 20 with the compartment floor.

In the embodiment of Fig. 4, the pedal extension 15 is shown as being provided with a plurality of locking lugs 17a positioned in series, whereby they may engage with the auxiliary locking plate 22 in the manner above described. These lugs 17a may, as shown, be formed integrally with the pedal lever. With this arrangement the brakes may be firmly set and locked in such condition by engagement of the appropriate lug 17a with the locking plate. Compensation may thus be made for different adjustments of the brake connections so that the brakes may be locked in firmly set condition, irrespective of brake adjustments.

According to the preferred embodiment of the invention shown in Fig. 3, the general arrangement is similar to that already described above, but the operating mechanism is different in some of the details.

Mounted underneath the compartment floor 10 is a supporting member 31, provided with bearings for mounting a plunger 32, for longitudinal reciprocating movement. This plunger is urged into retracted or inoperative position by means of a compression spring 33, and mounted on the upper forward end thereof is the locking pawl or bolt 18b, positioned for cooperation with the locking lug 17b mounted upon the pedal lever 15b. The locking lug 17b and bolt 18b are provided with interengaging hook-like lugs or projections 34, adapted to contact and interlock with each other when in locking position, as shown in Fig. 3. At its lower or rearward end the plunger is provided with a cam or cam block 35 having an inclined cam surface 36 positioned for engagement with the conical end 37 of an operating rod 38, mounted in suitable bearings 39 in the compartment floor, and having an operating head or enlargement 40 and positioned beneath and in juxtaposition to the pedal, for convenient access by the operator's foot, in a manner similar to the mounting of the pawl plate 18.

In the operation of the embodiment of Fig. 3, the operator depresses the pedal lever 15b to apply the brake, as in the embodiment of Figs. 1 and 2. When the pedal is fully depressed to set the brake and it is desired to lock the mechanism in this condition, the operator presses downwardly upon the operating rod 38, which engages the cam 36, to project the plunger 32 forwardly into locking position. Upon the slight retraction of the pedal lever the locking lug 17b engages the locking bolt 18b, thus holding the pedal from further retraction and maintaining the brakes in applied condition. The hook-like lugs 34 will now interengage and interlock with each other, thus holding the locking bolt from retraction under the influence of the spring 33. Therefore, the brake will remain in locked condition until it is again desired to release it, whereupon a slight depression of the pedal lever will cause the holding lugs 34 to be disengaged from each other, and will cause the detent 18b to be retracted to releasing position through action of the spring 33, whereupon the pedal lever and brake will be released.

In the various embodiments it will be noted that the brake lever must be depressed to set the brake approximately into full controlling position before the locking pawl can engage the locking lug to hold the lever in brake applying position. All intermediate positions of the brake lever between this fully depressed position and its normal non-applying position are not subject to locking cooperation to lock the lever by the locking pawl. Therefore, there can be no interference by the locking mechanism during the normal service control operation of the brake lever when it is not desired to lock the lever to hold the brakes in set condition.

Figs. 5 and 6 disclose a modified embodiment of the locking lug and locking pawl wherein the lug 17c is in the form of a bifucated member secured in position upon the brake pedal 15c by means of a set-screw or similar securing means. The locking pawl or bolt 18c also has a bifurcated locking terminal, and both the lug and the pawl are provided on each fork with interengaging retaining lugs 34c, which function in a manner similar to the lugs 34 described. Although the locking lugs 17b and 17c are shown as being secured for adjustment upon the brake pedal lever, it may, in some cases, be desirable to construct these locking lugs integrally with the brake pedal lever and to provide a plurality of such lugs in series in a manner suggested in Fig. 4, and it is to be understood that these modifications are within the scope of the invention.

The invention disclosed and claimed herein is disclosed in applicant's prior copending application Serial Number 726,434, filed May 19, 1934. This application, therefore, is a division of the earlier application.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a vehicle controlling system, in combination, a control lever whereby the operator may exert control upon the vehicle, a locking lug operatively connected to said control lever for movement therewith, a locking pawl having a surface positioned for locking engagement with a surface of the locking lug, a longitudinally movable supporting bar upon which said locking pawl is mounted for movement therewith to and from locking positions with reference to said locking lug, a supporting bracket positioned beneath the floor of the vehicle and having bearings in which said supporting bar is mounted for longitudinal reciprocating sliding movement into locking and releasing positions, a stressed spring connected to said supporting bar and urging said locking pawl toward released position at all times, the mutually engaging surfaces of said locking lug and said locking pawl having interlocking formations held in interlocking engagement with each other by the said locking engagement of said locking lug against said pawl and cooperating when in this position to prevent longitudinal movement of said supporting bar out of its locking position by action of said stressed spring, said interlocking formations being relatively positioned so as to be released from interlocking engagement by depression of said control lever whereupon said spring moves said locking pawl out of locking position, so as to release said control lever, and an operating device independent of said control lever for longitudinally projecting said locking pawl into locking position when said control lever is in depressed position.

2. In a vehicle controlling system, in combination, a control lever whereby the operator may exert control upon the vehicle, a locking lug operatively connected to said control lever for movement therewith, a locking pawl having a surface positioned for locking engagement with a surface of the locking lug, a longitudinally movable supporting bar upon which said locking pawl is mounted for movement therewith to and from locking positions with reference to said locking lug, a supporting bracket positioned beneath the floor of the vehicle and having bearings in which said supporting bar is mounted for longitudinal reciprocating sliding movement into locking and releasing positions, a stressed spring connected to said supporting bar and urging said locking pawl toward released position at all times, the mutually engaging surfaces of said locking lug and said locking pawl having interlocking formations held in interlocking engagement with each other by the said locking engagement of said locking lug against said pawl and cooperating when in this position to prevent longitudinal movement of said supporting bar out of its locking position by action of said stressed spring, said interlocking formations being relatively positioned so as to be released from interlocking engagement by depression of said control lever whereupon said spring moves said locking pawl out of locking position, so as to release said control lever, a cam element attached to said longitudinally movable supporting bar and having a cam surface inclined to said bar, and an operating rod mounted for longitudinal reciprocation and extending to a point above the floor for operative access and having a cam surface at its lower extremity operatively engaging said inclined cam surface whereby actuation thereof will effect longitudinal projection of said locking pawl into locking position when said control lever is depressed.

3. In a vehicle controlling system, in combination, a control lever whereby the operator may exert control upon the vehicle, a locking lug operatively connected to said control lever for movement therewith, a locking pawl having a surface positioned for locking engagement with a surface of the locking lug, said locking lug being positioned at a point on said control lever so as to cooperate in locking relation with said locking pawl only when the control lever has been moved substantially into full controlling position, intermediate positions thereof being free from operative control by said locking pawl, an attaching device for attaching said locking lug to said control lever at different points therealong to vary its operative position along said lever, a longitudinally movable supporting bar upon which said locking pawl is mounted for movement therewith to and from locking positions with reference to said locking lug, a supporting bracket positioned beneath the floor of the vehicle and having bearings in which said supporting bar is mounted for longitudinal reciprocating sliding movement into locking and releasing positions, a stressed spring connected to said supporting bar and urging said locking pawl toward released position at all times, the mutually engaging surfaces of said locking lug and said locking pawl having interlocking formations held in interlocking engagement with each other by the said locking engagement of said locking lug against said pawl and cooperating when in this position to prevent longitudinal movement of said supporting bar out of its locking position by action of said stressed spring, said interlocking formations being relatively positioned so as to be released from interlocking engagement by depression of said control lever whereupon said spring moves said locking pawl out of locking position, so as to release said control lever, and an operating device independent of said control lever for longitudinally projecting said locking pawl into locking position when said control lever is in depressed position.

4. In a vehicle controlling system, in combination, a control lever whereby the operator may exert control upon the vehicle, a locking lug operatively connected to said control lever for movement therewith, a locking pawl having a surface positioned for locking engagement with a surface of the locking lug, said locking lug being positioned at a point on said control lever so as to cooperate in locking relation with said locking pawl only when the control lever has been moved substantially into full controlling position, intermediate positions thereof being free from operative control by said locking pawl, an attaching device for attaching said locking lug to said control lever at different points therealong to vary its operative position along said lever, a longitudinally movable supporting bar upon which said locking pawl is mounted for movement therewith to and from locking positions with reference to said locking lug, a supporting bracket positioned beneath the floor of the vehicle and having bearings in which said supporting bar is mounted for longitudinal reciprocating sliding movement into locking and releasing positions, a stressed spring connected to said supporting bar and urging said locking pawl toward released position at all times, a holding device maintained in holding position by the said locking engagement of said locking lug with said locking pawl to prevent longitudinal movement of said supporting bar out of its locking position by action of said stressed spring, but to release said supporting bar to action of said spring upon depression of said control lever, whereupon said spring moves said locking pawl out of holding position so as to release said control lever, and an operating device independent of said control lever for longitudinally projecting said locking pawl into locking position when said control lever is depressed.

5. In a vehicle brake controlling system, in combination, a brake control lever, a locking lug mounted on said brake lever for movement therewith, a locking device including a movably mounted locking pawl having a surface positioned for locking engagement with a surface of said locking lug, said locking lug being positioned at a point on said control lever so as to cooperate in locking relation with said locking pawl only when the control lever has been moved substantially into full brake controlling position, intermediate positions thereof being free from operative control by said locking device, an attaching device for attaching said locking lug to said control lever at different points therealong to vary its operative position on said lever, a stressed spring connected to said locking pawl urging it at all times toward released position, the mutually engaging surface of said locking lug and said locking pawl having interlocking formations held in interlocking engagement with each other by said locking engagement of the locking lug against the pawl and cooperating when in this position to prevent movement of said pawl out of locking position by action of said stressed spring, said interlocking formations being relatively positioned so as to be released from interlocking engagement by actuation of said control lever, whereupon the spring moves the pawl to lever-releasing position, and an operating device independent of said control lever for moving said locking pawl into locking position when the brake lever is moved to set the brake.

HELEN A. RANLETT.